United States Patent
Wang et al.

(10) Patent No.: US 6,956,075 B2
(45) Date of Patent: *Oct. 18, 2005

(54) HALOGENATED ELASTOMERIC COMPOSITIONS HAVING IMPROVED STABILITY AND GREEN STRENGTH

(75) Inventors: Hsien-Chang Wang, Bellaire, TX (US); Ilan Duvdevani, Houston, TX (US); Connie R. Qian, Houston, TX (US); Pawan K. Agarwal, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 242 days.

This patent is subject to a terminal disclaimer.

(21) Appl. No.: 10/398,302
(22) PCT Filed: Oct. 9, 2001
(86) PCT No.: PCT/US01/31431
§ 371 (c)(1), (2), (4) Date: Apr. 3, 2003
(87) PCT Pub. No.: WO02/31039
PCT Pub. Date: Apr. 18, 2002

(65) Prior Publication Data
US 2004/0097654 A1 May 20, 2004

Related U.S. Application Data

(63) Continuation-in-part of application No. 09/686,215, filed on Oct. 11, 2000, now Pat. No. 6,552,108.

(51) Int. Cl.$^7$ ................................................. C08K 5/29
(52) U.S. Cl. ........................ 524/251; 524/515; 524/528; 524/236
(58) Field of Search .............................. 524/251, 236, 524/515, 528

(56) References Cited

U.S. PATENT DOCUMENTS

| | | | |
|---|---|---|---|
| 2,631,984 A | 3/1953 | Crawford et al. .............. 265/5 |
| 2,732,354 A | 1/1956 | Morrissey et al. .............. 260/5 |
| 2,944,578 A | 7/1960 | Baldwin et al. ............ 152/330 |
| 2,964,489 A | 12/1960 | Baldwin et al. ............ 260/415 |
| 3,011,996 A | 12/1961 | Kuntz et al. ............... 260/41.5 |
| 3,037,954 A | 6/1962 | Gessler et al. ............. 260/29.8 |
| 3,099,644 A | 7/1963 | Parker et al. ............. 260/85.3 |
| 3,898,253 A | 8/1975 | Buckler et al. .......... 260/42.47 |
| 3,969,330 A | 7/1976 | Lasis et al. .................... 526/14 |
| 4,130,534 A | 12/1978 | Coran et al. ............... 260/33.6 |
| 4,130,535 A | 12/1978 | Coran et al. ............... 260/33.6 |
| 4,256,857 A * | 3/1981 | Buckler et al. ............. 525/379 |
| 4,454,304 A * | 6/1984 | Tsai ............................. 525/210 |
| 4,594,390 A | 6/1986 | Abdou-Sabet et al. ...... 525/232 |
| 4,921,910 A | 5/1990 | Lunt et al. .................... 525/74 |
| 5,013,793 A | 5/1991 | Wang et al. ................. 525/195 |
| 5,021,500 A | 6/1991 | Puydak et al. .............. 524/525 |
| 5,043,392 A | 8/1991 | Lunt et al. ................... 525/293 |
| 5,051,477 A | 9/1991 | Yu et al. ...................... 525/194 |
| 5,073,597 A | 12/1991 | Puydak et al. .............. 525/193 |
| 5,162,445 A | 11/1992 | Powers et al. ........... 525/333.4 |
| 5,177,147 A | 1/1993 | Spenadel et al. ............. 525/88 |
| 5,290,886 A | 3/1994 | Ellul .......................... 524/515 |
| 5,386,864 A | 2/1995 | Costemalle et al. ........ 152/510 |
| 5,428,099 A | 6/1995 | Morrar et al. .............. 524/515 |
| 5,597,866 A | 1/1997 | White et al. ................ 524/495 |
| 5,654,379 A | 8/1997 | Powers et al. ................ 525/74 |
| 5,910,543 A | 6/1999 | Patel et al. ................. 525/356 |
| 5,959,049 A | 9/1999 | Powers et al. .............. 526/185 |
| 6,060,563 A * | 5/2000 | Peiffer et al. ............... 525/213 |
| 6,552,108 B1 | 4/2003 | Wang et al. ................. 524/251 |
| 6,825,281 B2 | 11/2004 | Tse et al. ..................... 525/241 |
| 2004/0063823 A1 | 4/2004 | Wang et al. ................. 524/115 |

FOREIGN PATENT DOCUMENTS

| | | |
|---|---|---|
| EP | 0 474 926 | 3/1992 |
| WO | WO 92/02582 | 2/1992 |
| WO | WO 94/10214 | 5/1994 |
| WO | WO 97/02320 | 1/1997 |
| WO | WO 98/52994 | 11/1998 |

OTHER PUBLICATIONS

Tony Whelan, MSC, "Polymer Technology Dictionary," Chapman & Hall, p. 175 (1994).
Martin Van Duin and Aniko Souphanthong, "The Chemistry of Phenol–Formaldehyde Resin Vulcanization of EPDM: Part I. Evidence for Methylene Crosslinks," Rubber Chemistry and Technology, vol. 68, pp. 717–727 (1995).

* cited by examiner

Primary Examiner—Peter D. Mulcahy
(74) Attorney, Agent, or Firm—Kevin M. Faulkner; Leandro Arechederra

(57) ABSTRACT

The present invention is a composition and a method of forming a composition, the composition comprising at least a halogenated elastomer and an amine or phosphine. An additional rubber component may be present in the composition of the invention. In one embodiment, the halogenated elastomer is a isoolefin copolymer comprising a halomethylstyrene derived unit. The amine or phosphine compound is represented by the formula $(R^1R^2R^3)Q$, wherein $Q$ is a Group 15 element, and wherein $R^1$ is either hydrogen or a $C_4$ to $C_{30}$ hydrocarbyl group, $R^2$ is either hydrogen or a $C_1$ to $C_{30}$ hydrocarbyl group; and $R^3$ is either hydrogen or a $C_1$ to $C_{30}$ hydrocarbyl group provided that at least one of $R^1$, $R^2$ and $R^3$ is not hydrogen. The additional rubber is selected from butyl rubber, halogenated butyl rubber, star-branched butyl rubber, halogenated star-branched butyl rubber, isobutylene homopolymer, butadiene rubber, neoprene, nitrile rubbers, ethylene/propylene/diene terpolymers, ethylene/propylene copolymers, styrene butadiene rubbers, polybutadiene, polyisoprene, isoolefin/alkylstyrene copolymer, halogenated isoolefin/alkylstyrene copolymer, natural rubber, polypropylene, polyethylene, polyurethane, polyvinyl chloride, silicon rubber, propylene oxide polymer, and mixtures thereof.

70 Claims, No Drawings

HALOGENATED ELASTOMERIC COMPOSITIONS HAVING IMPROVED STABILITY AND GREEN STRENGTH

CROSS REFERENCE TO RELATED APPLICATIONS

This application is a continuation in part of and claims priority to U.S. application Ser. No. 09/686,215, filed Oct. 11, 2000, now U.S. Pat. No. 6,552,108, herein incorporated by reference in its intirety.

FIELD

The present invention relates generally to elastomeric compositions having improved thermal stability and green strength. These elastomeric compositions include compositions of a halogenated elastomer such as an isoolefin copolymer comprising a halomethylstyrene derived unit, and an amine. The composition may also include an additional rubber or halogenated rubber component.

BACKGROUND

Most conventional elastomers must be crosslinked, i.e., cured or vulcanized, in order to obtain suitably strong, shaped articles. However, crosslinking introduces relatively permanent bonds among the rubber's polymer molecules. Once these bonds are formed, they prevent adequate flowability for subsequent processing or molding. Thus, it is often desirable to process and mold elastomeric articles prior to curing.

Prior to being crosslinked, however, these elastomers often lack sufficient strength, also known as green strength, for easy handling and processing. Green strength refers to the cohesiveness and dimensional stability under relatively low stress of a rubber compound before it is vulcanized or cured. Green strength is important in such industries as tire manufacturing, where the innerlining and other layers of the tire may be formed in one stage, while curing takes place in a later stage. Green strength is important in allowing the manufacturer to shape and stretch the uncured elastomer, while maintaining other favorable properties such as low air permeability.

Ionomerization (i.e., ionomer formation) provides a means for modifying green strength without chemical crosslinking (i.e., formation of covalent bonds) through a cure process. Ionomerization of amines is also known in the art as "quaternization", due to the formation of a quaternary amine (ammonium ion). Since it is a reversible process, ionomerization provides green strength at lower temperature as well as good processability at higher temperatures. A typical method of ionomerization is the addition of tertiary amines to the elastomer compositions, the basic amine functionality interacting with a more acidic functional group on the polymer in order to form stable interactions that increase green strength. U.S. Pat. Nos. 3,898,253 and 4,256,8576 generally describe the use of tertiary amines to directly modify halobutyl rubber compositions to improve their green strength. However, halobutyl rubber, such as bromobutyl rubber, is not very reactive with these amines. Therefore, the mixture must be heated for a substantial period of time in order to obtain sufficient green strength.

SUMMARY

The present inventors have found that elastomer green strength and/or thermal stability in elastomers, especially halogenated elastomers, is greatly improved by blending the rubber with an amine or phosphine and an isoolefin copolymer comprising a halomethylstyrene derived unit. The combined elastomer and amine, for purposes of this description, may be the to form an "ionomer" or "ionomer composition". The formation of the ionomer can be in situ and with little or no heating.

The present invention is a composition and a method of forming a composition, the composition comprising at least two components. An additional rubber component may additionally be present in the composition of the invention. In one embodiment, the first component is an isoolefin copolymer comprising a halomethylstyrene derived unit. This copolymer is present in the composition from 95% to 5% by weight of the composition. The halogen may be any halogen, desirably chlorine or bromine.

In one embodiment, the isoolefin has between 4 and 7 carbon atoms and the copolymer includes from 0.5% to 20% by weight p-alkylstyrene, wherein from 0.01 mole % to 60 mole % of the methyl groups present on the benzene ring of the p-alkylstyrene contain a halogen atom. In a preferred embodiment, isoolefin copolymer is an EXXPRO™ Elastomer (ExxonMobil Chemical Company, Houston Tex.).

The amine or phosphine compound represented by the formula $(R^1R^2R^3)Q$, wherein Q is a Group 15 element, preferably nitrogen or phosphorous, and wherein $R^1$ is either hydrogen or a $C_4$ to $C_{30}$ hydrocarbyl group, $R^2$ is either hydrogen or a $C_1$ to $C_{30}$ hydrocarbyl group; and $R^3$ is either hydrogen or a $C_1$ to $C_{30}$ hydrocarbyl group provided that at least one of $R^1$, $R^2$ and $R^3$ is not hydrogen. The amine is present from 0.1 to 5% by weight of the composition. In another embodiment, the composition contains the amine from 0.1 mole % to 60 mole % relative to the mole % of halogen atom present in the composition.

When present, an additional elastomeric component (hereinafter referred to as a "rubber" or "rubber component") may be included in the composition from 5% to 95% by weight of the composition. The additional rubber is selected from butyl rubber, halogenated butyl rubber, star-branched butyl rubber, halogenated star-branched butyl rubber, isobutylene homopolymer, butadiene rubber, neoprene, nitrile rubbers, ethylene/propylene/diene terpolymers, ethylene/propylene copolymers, styrene butadiene rubbers, polybutadiene, polyisoprene, isoolefin/alkylstyrene copolymer, halogenated isoolefin/alkylstyrene copolymer, natural rubber, polypropylene, polyethylene, polyurethane, polyvinyl chloride, silicon rubber, propylene oxide polymer, and mixtures thereof.

DETAILED DESCRIPTION

The composition of the present invention include at least two components: an isoolefin copolymer comprising a halomethylstyrene derived unit and an amine or phosphine component. In another embodiment, an additional rubber may be present. The invention also includes a method of forming the composition with the amine and other components. The composition is initially uncured (or unvulcanized) when combined, but may also be cured to form a cured composition.

As used herein, in reference to Periodic Table "Groups", the new numbering scheme for the Periodic Table Groups are used as in HAWLEY'S CONDENSED CHEMICAL DICTIONARY 852 (13th ed. 1997).

The term "elastomer", as used herein, refers to any polymer or composition of polymers consistent with the ASTM D1566 definition. The term "elastomer" may be used interchangeably with the term "rubber", as used herein.

Isoolefin Copolymer Comprising a Halomethylstyrene Derived Unit

Compositions of the present invention include at least one halogenated elastomer. The halogenated elastomer in one embodiment of the invention is a random copolymer of comprising at least $C_4$ to $C_7$ isoolefin derived units, such as isobutylene derived units, and halomethylstyrene derived units. The halomethylstyrene unit may be an ortho-, meta-, or para-alkyl-substituted styrene unit. In one embodiment, the halomethylstyrene derived unit is a p-halomethylstyrene containing at least 80%, more preferably at least 90% by weight of the para-isomer. The "halo" group can be any halogen, desirably chlorine or bromine. The halogenated elastomer may also include functionalized interpolymers wherein at least some of the alkyl substituents groups present in the styrene monomer units contain benzylic halogen or some other functional group described further below. These interpolymers are herein referred to as "isoolefin copolymers comprising a halomethylstyrene derived unit" or simply "isoolefin copolymer".

The isoolefin copolymer may also include other monomer derived units. The isoolefin of the copolymer may be a $C_4$ to $C_{12}$ compound, non-limiting examples of which are compounds such as isobutylene, isobutene, 2-methyl-1-butene, 3-methyl-1-butene, 2-methyl-2-butene, 1-butene, 2-butene, methyl vinyl ether, indene, vinyltrimethylsilane, hexene, and 4-methyl-1-pentene. The copolymer may also further comprise multiolefin derived units. The multiolefin is a $C_4$ to $C_{14}$ multiolefin such as isoprene, butadiene, 2,3-dimethyl-1,3-butadiene, myrcene, 6,6-dimethyl-fulvene, hexadiene, cyclopentadiene, and piperylene, and other monomers such as disclosed in EP 0 279 456 and U.S. Pat. Nos. 5,506,316 and 5,162,425. Desirable styrenic monomer derived units that may comprise the copolymer include styrene, methylstyrene, chlorostyrene, methoxystyrene, indene and indene derivatives, and combinations thereof.

In another embodiment of the invention, the interpolymer is a random elastomeric copolymer of an ethylene derived unit or a $C_3$ to $C_6$ α-olefin derived unit and an halomethylstyrene derived unit, preferably p-halomethylstyrene containing at least 80%, more preferably at least 90% by weight of the para-isomer and also include functionalized interpolymers wherein at least some of the alkyl substituents groups present in the styrene monomer units contain benzylic halogen or some other functional group.

Preferred isoolefin copolymers may be characterized as interpolymers containing the following monomer units randomly spaced along the polymer chain:

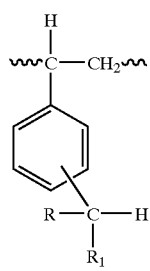

1.

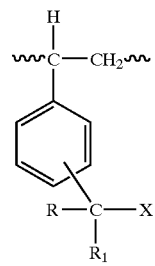

2.

wherein R and $R^1$ are independently hydrogen, lower alkyl, preferably $C_1$ to $C_7$ alkyl and primary or secondary alkyl halides and X is a functional group such as halogen. Desirable halogens are chlorine, bromine or combinations thereof. Preferably R and $R^1$ are each hydrogen. The —$CRR_1H$ and —$CRR_1X$ groups can be substituted on the styrene ring in either the ortho, meta, or para positions, preferably para. Up to 60 mole % of the p-substituted styrene present in the interpolymer structure may be the functionalized structure (2) above in one embodiment, and in another embodiment from 0.1 to 5 mol %. In yet another embodiment, the amount of functionalized structure (2) is from 0.4 to 1 mol %.

The functional group X may be halogen or some other functional group which may be incorporated by nucleophilic substitution of benzylic halogen with other groups such as carboxylic acids; carboxy salts; carboxy esters, amides and imides; hydroxy; alkoxide; phenoxide; thiolate; thioether; xanthate; cyanide; cyanate; amino and mixtures thereof. These functionalized isomonoolefin copolymers, their method of preparation, methods of functionalization, and cure are more particularly disclosed in U.S. Pat. No. 5,162,445.

Most useful of such functionalized materials are elastomeric random interpolymers of isobutylene and p-methylstyrene containing from 0.5 to 20 mole % p-methylstyrene wherein up to 60 mole % of the methyl substituent groups present on the benzyl ring contain a bromine or chlorine atom, preferably a bromine atom (p-bromomethylstyrene), as well as acid or ester functionalized versions thereof wherein the halogen atom has been displaced by maleic anhydride or by acrylic or methacrylic acid functionality. These interpolymers are termed "halogenated poly(isobutylene-co-p-methylstyrene)" or "brominated poly(isobutylene-co-p-methylstyrene)", and are commercially available under the name EXXPRO™ Elastomers (ExxonMobil Chemical Company, Houston Tex.). It is understood that the use of the terms "halogenated" or "brominated" are not limited to the method of halogenation of the copolymer, but merely descriptive of the copolymer which comprises the isobutylene derived units, the p-methylstyrene derived units, and the p-halomethylstyrene derived units.

These functionalized polymers preferably have a substantially homogeneous compositional distribution such that at least 95% by weight of the polymer has a p-alkylstyrene content within 10% of the average p-alkylstyrene content of the polymer. More preferred polymers are also characterized by a narrow molecular weight distribution (Mw/Mn) of less than 5, more preferably less than 2.5, a preferred viscosity average molecular weight in the range of from 200,000 up to 2,000,000 and a preferred number average molecular weight in the range of from 25,000 to 750,000 as determined by gel permeation chromatography.

The copolymers may be prepared by a slurry polymerization of the monomer mixture using a Lewis acid catalyst, followed by halogenation, preferably bromination, in solution in the presence of halogen and a radical initiator such as heat and/or light and/or a chemical initiator and, optionally, followed by electrophilic substitution of bromine with a different functional derived unit.

Preferred halogenated poly(isobutylene-co-p-methylstyrene) are brominated polymers which generally contain from 0.1 to 5 wt % of bromomethyl groups. In yet another embodiment, the amount of bromomethyl groups is from 0.2 to 2.5 wt %. Expressed another way, preferred copolymers contain from 0.05 up to 2.5 mole % of bromine, based on the weight of the polymer, more preferably from 0.1 to 1.25 mole % bromine, and are substantially free of ring halogen or halogen in the polymer backbone chain. In one embodiment of the invention, the interpolymer is a copolymer of $C_4$ to $C_7$ isomonoolefin derived units, a p-methylstyrene derived units and a p-halomethylstyrene derived units, wherein the p-halomethylstyrene units are present in the interpolymer from 0.4 to 1 mol % based on the interpolymer. In another embodiment, the p-halomethylstyrene is p-bromomethylstyrene. The Mooney Viscosity (1+8, 125° C., ASTM D1646, modified) is from 30 to 45 MU.

Amine/Phosphine Component

The amines or phosphines that are incorporated into the compositions of the invention are represented by the formula $(R^1R^2R^3)Q$, wherein Q is a Group 15 element, preferably nitrogen or phosphorous, and wherein $R^1$ is either hydrogen or a $C_4$ to $C_{30}$ hydrocarbyl group, $R^2$ is either hydrogen or a $C_1$ to $C_{30}$ hydrocarbyl group, and $R^3$ is either hydrogen or a $C_1$ to $C_{30}$, preferably a $C_1$ to $C_8$, hydrocarbyl group, provided that at least one of $R^1$, $R^2$ and $R^3$ is not hydrogen. Preferably, $R^3$ is a methyl or ethyl group and one of $R^1$ or $R^2$ is a $C_6$ to $C_{20}$ hydrocarbyl group and the other is a methyl or ethyl group. The hydrocarbyl groups, independently, may be saturated, unsaturated, cyclic or aromatic.

Any amine may be used so long as it is sufficiently compatible with the rubber component, and the isoolefin copolymer, and as long as permanent crosslinking is avoided. When improved green strength is desired, preferably, the amine component is one capable of ionomerizing the copolymer component. In one desirable embodiment, such amines may be more hindered and may be represented by the formula $(R^1R^2R^3)N$ wherein $R^1$ and $R^2$ are independently a $C_4$ to $C_{30}$ hydrocarbyl group and $R^3$ is either hydrogen or a $C_1$ to $C_{30}$ hydrocarbyl group.

Examples of suitable amine components include, but are not limited to: N,N-dimethyl hexadecylamine, N,N-dimethyl hexylamine, N,N-dimethyl dodecylamine, N,N-dimethyl octadecylamine, N,N-diethyl decylamine, N,N-dimethylbenzylamine, N,N-methyl propyl hexadecylamine, and morpholine.

The isoolefin copolymer, amine, and when present, the rubber components, are combined in amounts effective to produce the desired improvement in green strength and/or stability. The precise concentrations of each component will thus depend on the specific components used. The relative amounts of rubber and amine will generally dictate the degree the properties of the composition are influenced. When a halogenated rubber component is used, for example, the preferred amine level is from 0.05 to 2 mole equivalents of amine per rubber or isoolefin copolymer halogen, more preferably from 0.1 to 1 mole equivalent of amine per rubber or copolymer halogen.

The present invention is particularly effective when compositions of an isoolefin copolymer and another rubber are employed. The relative amounts of the isoolefin copolymer, amine or phosphine, and when present, the rubber component, will depend on the particular rubber component used. Preferably, only so much amine or phosphine and copolymer is used as is needed to improve green strength and/or stability to the desired degree. For example, the weight percent of the rubber component may vary from as little as 5% to up to 95% by weight of the composition, more preferably from 10% to 90% by weight of the composition, even more preferably from 20% to 80% by weight of the composition.

The method used to combine the at least two components is not critical as long as there is adequate dispersion of the amine and other components within the rubber. Thus, any mixing device may be used. In one embodiment, the components are combined and mixed at from 20 to 200° C. The mixing may be facilitated by heating the mixture from 50° C. up to 200° C., and from 50° C. up to 150° C. in another embodiment in an internal mixer or rubber mill. Notably, it is not necessary to heat the mixture and/or mix for extended periods of time after mixing is achieved in order to obtain adequate ionomerization. Once the components are mixed, additional mixing or heating time for reaction should not be necessary.

The mixing order is not critical. For convenience, the at least two components may be mixed at one time. Alternatively, the rubber component and amine (and other components when present) may be combined first, followed by addition of the isoolefin copolymer. For some applications, it may be desirable to pre-composition the amine and rubber and then add the isoolefin copolymer, or pre-composition the isoolefin copolymer and rubber followed by the amine.

Various additives may be used in suitable amounts. For example, various reinforcing agents or fillers such as carbon black, clay, silica, talc, and the like may be combined with the composition at any point during production. Various colorants may be added such as titanium dioxide, carbon black, etc. Other additives include antioxidants, stabilizers, processing oils, lubricants, anti-static agents, waxes, flame retardants and plasticizers.

After the isoolefin copolymer, amine, and when present, the rubber, are combined, the composition having improved green strength may be used directly in molded, extruded or shaped articles. It may be necessary to heat the composition in order to obtain the necessary viscosity for molding.

Additional Rubber Component

An additional elastomeric or "rubber" component may be included in compositions of the invention. The term "rubber" or "rubber component" as used herein may include, but is not in any way limited to, the following polymers: butyl rubber, halogenated butyl rubber, star-branched butyl rubber, halogenated star-branched butyl rubber, isobutylene homopolymer, butadiene rubber, neoprene, nitrile rubbers, ethylene/propylene/diene terpolymers, ethylene/propylene copolymers, styrene butadiene rubbers, polybutadiene, polyisoprene, isoolefin/alkylstyrene copolymer, halogenated isoolefin/alkylstyrene copolymer, natural rubber, polypropylene, polyethylene, polyurethane, polyvinyl chloride, silicon rubber, propylene oxide polymer, and mixtures thereof. Other suitable rubbers are disclosed in, for example, RUBBER TECHNOLOGY (Maurice Morton, ed., Chapman & Hall 1995), and are well known in the art.

As used herein the term "butyl rubber" is defined to mean a polymer predominately comprised of repeat units of isobutylene but including a few repeat units of a multiolefin. Preferably from 85% to 99.5% by weight of the butyl rubber are repeat units derived from the polymerization of isobutylene, while from 0.1% to 15% by weight of the repeat units are derived from a multiolefin having from 4 to 8 carbon atoms such as butadiene, isoprene, hexadiene, etc., with isoprene being preferred.

"Halogenated butyl rubber" is defined to mean butyl rubber that contains at least 0.05% by weight halogen such as chlorine or bromine, preferably bromine. Preferred halogenated butyl rubbers are those that contain from 0.1% to 15% by weight halogen, more preferably from 0.5% to 10.0% by weight halogen based on the total weight of the halogenated polymer. Numerous patents disclose halogenated butyl rubber containing various amounts of chemically bound halogen, see for example, U.S. Pat. Nos. 2,631,984, 2,732,354, 3,099,644, 2,944,578, 3,943,664, 2,964,489, and 4,130,534.

As used herein "nitrile rubbers" are copolymers of acrylonitrile with a conjugated diene having from 4 to 8 carbon atoms, with butadiene being preferred.

As used herein, "ethylene/propylene copolymers" are defined to mean those elastomeric or thermoplastic curable copolymers comprising ethylene and propylene. The preferred ethylene/propylene copolymer is one in which the ethylene component is between 20 and 90% by weight of the copolymer.

As used herein, "ethylene/propylene/diene terpolymers" are defined as those elastomeric or thermoplastic curable terpolymers comprising ethylene, propylene and diene units. Preferred diene units are 5-ethylidene norbornene, 5-methylidene norbornene, dicyclopentadiene, 1,4-hexadiene and 5-vinyl norbornene.

As used herein, "isoolefin/alkylstyrene copolymers" and "halogenated isoolefin/alkylstyrene copolymers" refer to copolymers comprising an isoolefin and an alkylstyrene, preferably a methylstyrene.

Cure Agents and Accelerators

The compositions may also be cured using conventional curing or vulcanizing agents. Examples include sulfur and sulfur vulcanizing agents; various organic peroxides such as benzoylperoxide, dicumylperoxide, 2,5-dimethyl-2,5 di(tertbutylperoxy)hexane, and 2,2'-bis(tertbutylperoxy) diisopropyl benzene; hydrosilation curing agents; metal oxides such as zinc oxide or magnesium oxide, or organic zinc salts such as zinc stearate; diamines; co-curing agents such as various maleimides; and the like; all as set forth in U.S. Pat. No. 5,073,597. Moreover, various phenolic resins known to the art and to the literature can be utilized, as well as various phenol-formaldehyde resins as set forth in "The Chemistry of Phenol-Formaldehyde Resin Vulcanization of EPDM: Part I. Evidence for Methylene Crosslinks," by Martin Van Duin and Aniko Souphanthong, 68 RUBBER CHEMISTRY AND TECHNOLOGY 717–727 (1995).

The amount of the curing agent will generally vary depending upon the type utilized and especially the desired degree of cure, as is well recognized in the art. For example, the amount of sulfur is generally from 1 to 5, and preferably from 2 to 3 parts by weight per 100 parts by weight of the composition. The amount of the peroxide curing agent is generally from 0.1 to 2.0 parts by weight, the amount of the phenolic curing resin is generally from 2 to 10 parts by weight, and the amount of the hindered amine is from 0.1 to 2 parts by weight, all based upon 100 parts by weight of the composition.

Whenever a halogenated butyl rubber or any halogenated rubber is utilized, a small amount of an alkaline earth oxide compound such as magnesium oxide is utilized in an amount of 3 phr or less, and desirably 2 phr or less for every 100 phr of the halogenated rubber. The alkaline earth oxide is added to act as a scavenger of hydrogen halides.

Conventional catalysts (accelerators) can also be utilized such as those known to the art and to the literature. For example, suitable amounts of various Friedel-Crafts catalysts can be utilized such as stannous chloride, salicylic acid, p-toluene sulfonic acid, zinc chloride, and the like.

The amount of the curative and accelerators are such that a degree of cure, that is, at least 90%, desirably at least 95 or 96%, preferably at least 97% or 98% of the curable rubber is non-extractable in a suitable solvent for the particular rubber at 23° C. Suitable solvents include xylene, cyclohexane, acetone, hexane, toluene, and the like.

It has surprisingly been found that, once the compositions are cured, they demonstrate improved thermal and aging stabilization when the composition of the present invention is cured. Thus, not only is green strength improved, the overall characteristics of the cured rubber product are improved.

The compositions of this invention have a wide variety of ultimate uses. For example, tubings, hoses, gaskets, diaphragms, tires, innerliners, films, bumpers, membranes, adhesives, innertubes and other items where rubbers or rubber-copolymer compositions are employed.

The following examples are presented to illustrate the foregoing discussion. Although the examples may be directed to certain embodiments of the present invention, they are not to be viewed as limiting the invention in any specific respect.

EXAMPLE 1

A series of compounds shown in Table 1 were prepared according to the following details. Two elastomers from ExxonMobil Chemical were used: Bromobutyl 2222 specified to contain 2 wt % of bromine and having a Mooney viscosity of 32 at 125° C. (1+8) (ASTM D1646 modified), and EXXPRO™ 89-1 Elastomer (ExxonMobil Chemical Company, Houston Tex.), a brominated poly(isobutylene-co-p-methylstyrene) having 0.75 mole % bromine, or 1.2 wt % bromine on a 5 wt % p-methylstyrene (PMS) containing polymer having a Mooney viscosity of 35 at 125° C. (1+8) (ASTM D1646 modified).

Three Master Batch (MB) compounds were mixed in an internal lab mixer (a BR Banbury mixer by Farrel Co.) incorporating all of the ingredients shown in Table 1, except for the amine ingredient. MB1 (compounds 1A through 1D) were based on the bromobutyl elastomer. MB2 (compounds 2A and 2B), and MB3 (compounds 3A and 3B) were based on a mixture of the bromobutyl and EXXPRO™ Elastomers. The amine used was a tertiary amine, N,N-dimethylhexadecylamine, Armeen DM16D (Akzo Nobel Co.). The amine was added at the levels shown in Table 1 on a two-roll rubber mill.

The MB mixes had a total batch weight of 1500 g each following the formulations in Table 1 (excluding amine). The mixer was operated at 100 RPM with 60° C. water circulated through the mixer walls. The elastomers were added to the mixer first with all other ingredients added 30 seconds after introduction of the elastomers into the mixer. The mixed compounds were removed from the mixer when the compound temperature reached 150° C.

The MB ingredients shown in Table 1 other than the ones described above were: a paraffinic oil, Drakeol™ 35 mineral oil (PenRe Co.); carbon black designated as N 660 black; stearic acid (Witco Co.); Magnesium oxide, Maglite™ K (C. P. Hall Co.).

The amine described above was added to 350 g portions of the three MB compounds on a lab rubber mill of 6×13 inch. (or 15.2×33 cm) roll size (KBS Corp.). The mill had cooling water at 27° C. circulated through the rolls. The mill mix procedure started with mixing the MB compounds on the mill following gradual addition of the liquid amine, until it was evenly dispersed by cutting and rolling a number of times.

The compounds of Table 1 were then calendered at a low speed between 2 calender rolls kept at 85° C. The calendering process started by warming up the compounds on the calender to the point the compound stayed smoothly on one roll. Following this, the compound was left on the turning roll for 2 minutes to obtain a homogeneous temperature, after which the compound was removed as a smooth sheet of 3 mm thick.

The sheets were pressed into pads of 0.2×15×15 cm between Mylar polyester film in a 100° C. mold. Samples of 0.5×3 inch (1.25×7.6 cm) were cut for testing.

Green strength was tested using two different Instron testers, one that was equipped with an environmental chamber heated to 40° C. The samples were clamped at 1 inch (2.54 cm) distance between the tester clamps. The test was conducted by moving the clamps apart at a speed of 5 in/min (12.7 cm/min) to a 100% extension, a total stretching distance of 1 inch (2.54 cm). The "engineering stress" (force divided by original cross sectional area) at 100% extension was defined as the "green strength", and is shown in Table 1 for 2 testing temperatures, ambient (25° C.) and 40° C.

A different portion of 250 g each of the calendered samples of Table 1 were additionally mixed with a typical tire innerliner cure package on the lab mill described above. The mill rolls were kept cool by circulating 24° C. water through them. The cure ingredients consisted of 3 phr zinc oxide (Kadox™ 930C from Zinc Corporation of America), 0.5 phr sulfur from R.E. Carroll, Inc. and 1.5 phr MBTS (Altax™ from R.T. Vanderbilt Company, Inc.). The term "phr" (parts per hundred rubber) designates the proportion of the ingredient level per 100 g of the total elastomer or elastomer composition from Table 1. The compounds were then cured in a hot press at 160° C. for 18 to 27 minutes at a time equal to 90% cure time (t90) plus 2 minutes as determined by a curometer test using an ODR 2000E (Alpha Instruments), operating at 160° C. at 3° arc and a standard oscillation rate of 100 cpm, for 60 min.

All the test results are shown in Table 1. Samples 1A through 1D show a progressive increase in green strength with amine levels from zero to 1.5 phr. This increase in green strength indicates an ionic association between the polymer molecules with addition of the tertiary amine.

For compounds 2B and 3B, green strength at an amine level of 0.5 phr was similar to the green strength of sample 1D at 1.5 phr level of the amine, with sample 3B having a somewhat higher green strength than sample 2B. This indicates that in the presence of EXXPRO™ 89-1 Elastomer, the ionic association was much stronger. At 1.0 and 1.5 phr of amine, MB compounds 2 and 3 exhibited very high viscosities such that calendering could not produce smooth sheets.

Cured compound results are shown in terms of hardness in Shore A units. It is normally experienced that hardness goes up with heat aging in halobutyl compounds as is the case with compounds 1A, 2A and 3A. However, the addition of tertiary amine reduced the hardening with aging under heat. It can be seen in Table 1 that 0.5 to 1.0 phr of tertiary amine is enough to virtually stop heat aging after 48 hours of exposure at 125° C.

This example demonstrates increased green strength with the addition of tertiary amine to bromobutyl compounds and particularly when brominated poly(isobutylene-co-p-methylstyrene) (EXXPRO™ Elastomers) present in the compound. The example also demonstrates improved heat aging stability with the addition of a tertiary amine to bromobutyl and to mixtures of bromobutyl and EXXPRO™ Elastomer.

EXAMPLE 2

A series of compounds shown in Table 2A was mixed in an internal lab mixer following the procedure described in Example 1. Three elastomers were used in this series, the two described in Example 1 (bromobutyl 2222 and EXXPRO™ 89-1 Elastomer) and a third brominated poly(isobutylene-co-p-methylstyrene) elastomer, EXXPRO™ 3035 Elastomer (ExxonMobil Chemical Company, Houston Tex.). The third polymer had a backbone containing 5% by weight PMS before bromination, 0.48 mole % of bromine, and a Mooney viscosity of 45 at 125° C. (1+8) (ASTM D1646 modified). In this series, the tertiary amine was introduced into the internal mixer close to the end of the mixing cycle. The cure package described in Example 1 was also used in this example by incorporating it on a 2-roll rubber mill as described in Example 1.

In this series, pairs of compounds are compared with and without added tertiary amine. Compounds 4A and 4B compare bromobutyl based compounds, 5A and 5B compare compositions of bromobutyl with 2.0 phr of EXXPRO™ 89-1 Elastomer, and 6A and 6B compare bromobutyl compositions with 2.0 phr of EXXPRO™ 3035 Elastomer. For the straight bromobutyl 1 phr amine was added in compound 4B and for the mixed elastomer compounds a lower level of the same amine, 0.5 phr, was added in compounds 5B and 6B.

The green strength of each compound of Example 2 was tested as in Example 1, but the samples were extended to break at 40° C. and an extension rate of 10 in/min (25.4 cm/min). This example demonstrates an increase of 100% modulus (a measure of green strength) with the addition of amine. The 6A and 6B pair, where EXXPRO™ 3035 Elastomer was used, show the highest increase in 100% modulus and elongation to break. In this example, as in Example 1, addition of amine reduces heat-aging affects. It is shown in Table 2B that all compounds containing the tertiary amine show lesser changes with heat aging for cured modulus, elongation and hardness.

The example also shows that amine addition does not affect the physical properties of the unaged compounds. Further, the improved heat aging stability by adding the tertiary amine is shown for bromobutyl compounds with or without the presence of EXXPRO™ Elastomer polymers in the composition.

EXAMPLE 3

A series of tire innerliner model compounds shown in Table 3 was mixed in an internal lab mixer following the procedure of Example 2, where all ingredients were added to the internal mixer. The series is based on a composition of 70/30 brominated-star-branched butyl (BrSBB 6222, ExxonMobil Chemical Company, Houston Tex.) with a brominated poly(isobutylene-co-p-methylstyrene) (EXXPRO™ 90-3 Elastomer, ExxonMobil Chemical). The BrSBB 6222 contained a specified amount of 2.4% by weight bromine and had a Mooney viscosity of 32 at 125° C. (1+8) (ASTM D1646 modified). The EXXPRO™ Elastomer, 90-3, had a backbone containing 5 wt % of PMS before bromination and had 0.52 mole % bromine and a Mooney viscosity of 55 at 125° C. In the compounds of this series, a homogenizing agent, Struktol 40 MS (Struktol™ Company) and a tackifying phenolic resin, SP-1068 (Schenectady International Inc.) were also used. The tertiary amine of this series was trihexadecylamine from the same source as the amine of Examples 1 and 2.

The compounds of this series contain an increasing amount of amine from zero in compound 7 to 1.08 phr in compound 10. Green tensile strength was tested for the compounds of Table 3 following the procedure used in Example 2, at 40° C. The 100% modulus and elongation to break of all the compounds in Table 3 are not significantly different from each other. This example demonstrates that a tertiary amine which is highly hindered such as trihexadecyl amine, having 3 $C_{16}$ branches attached to the nitrogen, is not effective in creating strong associations between the polymer chains as the amine of Examples 1 and 2.

In all, these examples show the utility of the present invention. By addition of a tertiary amine to the rubber and copolymer components the green strength is increased, while also improving the thermal stability of the cured product. The data in Tables 1 and 2 shown that, in the case of Bromobutyl 2222 alone, the presence of amine improves thermal stability. When a halogenated isoolefin/alkylstyrene such as an EXXPRO™ Elastomer is present with the Bromobutyl 2222, and amine is then added, the green strength and thermal stability is improved. The amounts of the various components can be modified to suit different manufacturing needs, as well as the choice of the amine itself.

While the present invention has been described and illustrated by reference to particular embodiments, those of ordinary skill in the art will appreciate that the invention lends itself to many different variations not illustrated herein. For these reasons, then, reference should be made solely to the appended claims for purposes of determining the true scope of the present invention.

All priority documents are herein fully incorporated by reference for all jurisdictions in which such incorporation is permitted. Further, all documents cited herein, including testing procedures, are herein fully incorporated by reference for all jurisdictions in which such incorporation is permitted.

TABLE 2A

Compositions 4A–6B

| Compound (phr) | 4A | 4B | 5A | 5B | 6A | 6B |
|---|---|---|---|---|---|---|
| Bromobutyl 2222 | 100 | 100 | 80 | 80 | 80 | 80 |
| EXXPRO ™ 89-1 Elastomer | 0 | 0 | 20 | 20 | 0 | 0 |
| EXXPRO ™ 3035 Elastomer | 0 | 0 | 0 | 0 | 20 | 20 |
| Paraffinic Oil | 10 | 10 | 10 | 10 | 10 | 10 |
| N 660 Black | 50 | 50 | 50 | 50 | 50 | 50 |
| Stearic Acid | 2 | 2 | 2 | 2 | 2 | 2 |
| MgO | 0.15 | 0.15 | 0.15 | 0.15 | 0.15 | 0.15 |
| N,N-dimethyl hexadecylamine | 0 | 1 | 0 | 0.5 | 0 | 0.5 |

TABLE 2B

Properties of Compositions 4A–6B

| | 4A | 4B | 5A | 5B | 6A | 6B |
|---|---|---|---|---|---|---|
| 40° C. Green Tensile Strength | | | | | | |
| 100% Modulus, MPa | 0.188 | 0.212 | 0.208 | 0.283 | 0.211 | 0.292 |
| Elongation % | 317 | 341 | 351 | 575 | 326 | 643 |
| Cured Tensile Strength, Unaged, Test Temperature 25° C. | | | | | | |
| 100% Modulus, MPa | 1.20 | 1.21 | 1.24 | 1.38 | 1.27 | 1.23 |
| % Strain at break | 688 | 685 | 672 | 699 | 723 | 748 |
| Cured Tensile Strength, Aged 48 h at 120° C., Test Temperature 25° C. | | | | | | |
| 100% Modulus, MPa | 1.94 | 1.51 | 1.76 | 1.68 | 1.83 | 1.49 |
| % Strain at break | 564 | 644 | 518 | 640 | 596 | 698 |
| Cured Tensile Strength, Aged 48 h at 140° C., Test Temperature 25° C. | | | | | | |
| 100% Modulus, MPa | 1.79 | 1.48 | 1.99 | 1.52 | 1.88 | 1.48 |
| % Strain at break | 562 | 640 | 512 | 634 | 586 | 697 |
| Shore A Hardness (Cured) | | | | | | |
| Unaged | 47.1 | 51.1 | 54.7 | 53.7 | 54.3 | 51.9 |
| Aged (48 h at 120° C.) | 58.1 | 53.1 | 58.1 | 55.5 | 58.2 | 54.1 |
| Aged (48 h at 140° C.) | 60.7 | 54.5 | 59.7 | 55.3 | 57.1 | 54.1 |

TABLE 1

Compositions 1A–3B

| Compound (phr) | 1A | 1B | 1C | 1D | 2A | 2B | 3A | 3B |
|---|---|---|---|---|---|---|---|---|
| Bromobutyl 2222 | 100 | 100 | 100 | 100 | 70 | 70 | 50 | 50 |
| EXXPRO ™ 89-1 Elastomer | 0 | 0 | 0 | 0 | 30 | 30 | 50 | 50 |
| Paraffinic Oil | 10 | 10 | 10 | 10 | 10 | 10 | 10 | 10 |
| N 660 Black | 50 | 50 | 50 | 50 | 50 | 50 | 50 | 50 |
| Stearic Acid | 2 | 2 | 2 | 2 | 2 | 2 | 2 | 2 |
| MgO | 0.15 | 0.15 | 0.15 | 0.15 | 0.15 | 0.15 | 0.15 | 0.15 |
| N,N-dimethyl hexadecylamine | 0.0 | 0.5 | 1.0 | 1.5 | 0.0 | 0.5 | 0.0 | 0.5 |
| Green Strength-100% Modulus | | | | | | | | |
| 25° C., MPa | 0.241 | 0.317 | 0.358 | 0.388 | 0.236 | 0.335 | 0.241 | 0.381 |
| 40° C., MPa | 0.182 | 0.220 | 0.255 | 0.305 | 0.176 | 0.243 | 0.178 | 0.270 |
| Cured Hardness-Shore A | | | | | | | | |
| Unaged | 55.3 | 52.5 | 52.7 | 53.1 | 54.1 | 52.3 | 53.5 | 51.7 |
| Aged 48 h at 125° C. | 59.5 | 53.7 | 53.1 | 51.3 | 60.1 | 53.1 | 58.3 | 51.9 |

TABLE 3

| | Compositions 7–10 | | | |
|---|---|---|---|---|
| Compound (phr) | 7 | 8 | 9 | 10 |
| BrSBB 6222 | 70 | 70 | 70 | 70 |
| EXXPRO ™ 90-3 Elastomer | 30 | 30 | 30 | 30 |
| Paraffinic Oil | 10 | 10 | 10 | 10 |
| Struktol 40 MS | 5 | 5 | 5 | 5 |
| 660 Black | 60 | 60 | 60 | 60 |
| SP-1068 Resin | 4 | 4 | 4 | 4 |
| Stearic Acid | 2 | 2 | 2 | 2 |
| MgO | 0.15 | 0.15 | 0.15 | 0.15 |
| Trihexadecylamine | 0 | 0.36 | 0.72 | 1.08 |
| Green Tensile Strength, 40° C. | | | | |
| 100% Modulus, MPa | 0.239 | 0.237 | 0.235 | 0.256 |
| % Elongation | 376 | 374 | 426 | 365 |

We claim:

1. A composition comprising:
   at least one isoolefin copolymer comprising a halomethylstyrene derived unit, the isoolefin having between 4 and 7 carbon atoms and the copolymer containing from 0.5% to 20% by weight halomethylstyrene; and
   an amine compound represented by the formula $(R^1R^2R^3)N$, wherein $R^1$ is either hydrogen or a $C_4$ to $C_{30}$ hydrocarbyl group, $R^2$ is either hydrogen or a $C_1$ to $C_{30}$ hydrocarbyl group; and $R^3$ is either hydrogen or a $C_1$ to $C_{30}$ hydrocarbyl group, provided that at least one of $R^1$, $R^2$ and $R^3$ is not hydrogen.

2. The composition of claim 1, wherein the composition also comprises an additional rubber component selected from butyl rubber, halogenated butyl rubber, star-branched butyl rubber, halogenated star-branched butyl rubber, isobutylene homopolymer, butadiene rubber, neoprene, nitrile rubbers, ethylene/propylene/diene terpolymers, ethylene/propylene copolymers, styrene butadiene rubbers, polybutadiene, polyisoprene, isoolefin/alkylstyrene copolymer, halogenated isoolefin/alkylstyrene copolymer, natural rubber, polypropylene, polyethylene, polyurethane, polyvinyl chloride, silicon rubber, propylene oxide polymer, and mixtures thereof.

3. The composition of claim 2, wherein the rubber component is present in the composition from 5% to 95% by weight of the composition.

4. The composition of claim 1, wherein the rubber component is halogenated butyl rubber.

5. The composition of claim 1, wherein the isoolefin copolymer is a halogenated poly(isobutylene-co-p-methylstyrene).

6. The composition of claim 5, wherein from 0.01 mole % to 60 mole % of the methyl groups present on the styrene are halomethyl groups.

7. The composition of claim 4, wherein the halogenated butyl rubber contains from 85% to 99.5% by weight repeat units derived from isobutylene, from 0.1 to 15% by weight repeat units derived from conjugated diene and from 0.1% to 15% by weight halogen.

8. The composition of claim 4, wherein the halogenated butyl rubber contains from 85% to 99.5% by weight repeat units derived from isobutylene, from 0.1 to 15% by weight repeat units derived from isoprene and from 0.1% to 15% by weight bromine.

9. The composition of claim 5, wherein the copolymer contains isobutylene from 88% to 98% by weight copolymer.

10. The composition of claim 1, wherein the composition contains from 0.05 to 2 mole equivalents of amine relative to the number of moles of halogen present in the composition.

11. The composition of claim 1, wherein $R^3$ is a $C_1$ to $C_8$ hydrocarbyl group.

12. The composition of claim 1, wherein both $R^1$ and $R^2$ are hydrogen.

13. The composition of claim 1, wherein both $R^1$ and $R^2$ are $C_4$ to $C_{30}$ hydrocarbyl groups.

14. The composition of claim 1, wherein $R^1$ is a $C_4$ to $C_{30}$ hydrocarbyl group and $R^2$ is a $C_1$ to $C_4$ hydrocarbyl group.

15. The composition of claim 1, wherein $R^1$ is a $C_4$ to $C_{30}$ hydrocarbyl group, $R^2$ is a $C_1$ to $C_4$ hydrocarbyl group and $R^3$ is a $C_1$ to $C_8$ hydrocarbyl group.

16. The composition of claim 1, wherein the amine compound is selected from N,N-dimethylhexadecylamine, N,N-dimethylhexylamine, N,N-dimethyldodecylamine, N,N-dimethyloctadecylamine, N,N-diethyldecylamine, N,N-dimethylbenzylamine, N,N-methylpropylhexadecylamine, and morpholine.

17. The composition of claim 1, wherein the amine is present from 0.01 to 5 wt % of the composition.

18. The composition of claim 1, wherein the composition is cured.

19. A composition comprising:
   from 5% to 95% by weight of a rubber component;
   an amine compound represented by the formula $(R^1R^2R^3)N$, wherein $R^1$ is either hydrogen or a $C_4$ to $C_{30}$ hydrocarbyl group, $R^2$ is either hydrogen or a $C_1$ to $C_{30}$ hydrocarbyl group; and $R^3$ is either hydrogen or a $C_1$ to $C_{30}$ hydrocarbyl group, provided that at least one of $R^1$, $R^2$ and $R^3$ is not hydrogen; and
   at least one isoolefin copolymer comprising a halomethylstyrene derived unit, the isoolefin having between 4 and 7 carbon atoms and the copolymer containing from 0.5% to 20% by weight halomethylstyrene, the isoolefin having between 4 and 7 carbon atoms.

20. The composition of claim 19, wherein the additional rubber component selected from butyl rubber, halogenated butyl rubber, star-branched butyl rubber, halogenated star-branched butyl rubber, isobutylene homopolymer, butadiene rubber, neoprene, nitrile rubbers, ethylene/propylene/diene terpolymers, ethylene/propylene copolymers, styrene butadiene rubbers, polybutadiene, polyisoprene, isoolefin/alkylstyrene copolymer, halogenated isoolefin/alkylstyrene copolymer, natural rubber, polypropylene, polyethylene, polyurethane, polyvinyl chloride, silicon rubber, propylene oxide polymer, and mixtures thereof.

21. The composition of claim 19, wherein the rubber component is halogenated butyl rubber.

22. The composition of claim 19, wherein the rubber component is a halogenated isoolefin/alkylstyrene copolymer.

23. The composition of claim 21, wherein the halogenated butyl rubber contains from 85% to 99.5% by weight repeat units derived from isobutylene, from 0.1 to 15% by weight repeat units derived from conjugated diene and from 0.1% to 15% by weight halogen.

24. The composition of claim 22, wherein the copolymer contains isobutylene from 88% to 98% by weight of the copolymer.

25. The composition of claim 19, wherein the isoolefin copolymer is halogenated poly(isobutylene-co-p-methylstyrene).

26. The composition of claim 25, wherein from 0.01 mole % to 60 mole % of the methyl groups are halomethyl groups.

27. The composition of claim 19, wherein the composition contains from 0.05 to 2 mole equivalents of amine relative to the number of moles of halogen present in the composition.

28. The composition of claim 19, wherein $R^3$ is a $C_1$ to $C_8$ hydrocarbyl group.

29. The composition of claim 19, wherein both $R^1$ and $R^2$ are hydrogen.

30. The composition of claim 19, wherein both $R^1$ and $R^2$ are $C_4$ to $C_{30}$ hydrocarbyl groups.

31. The composition of claim 19, wherein $R^1$ is a $C_4$ to $C_{30}$ hydrocarbyl group and $R^2$ is a $C_1$ to $C_4$ hydrocarbyl group.

32. The composition of claim 19, wherein $R^1$ is a $C_4$ to $C_{30}$ hydrocarbyl group, $R^2$ is a $C_1$ to $C_4$ hydrocarbyl group and $R^3$ is a $C_1$ to $C_8$ hydrocarbyl group.

33. The composition of claim 19, wherein the amine compound is selected from N,N-dimethylhexadecylamine, N,N-dimethylhexylamine, N,N-dimethyldodecylamine, N,N-dimethyloctadecylamine, N,N-diethyldecylamine, N,N-dimethylbenzylamine, N,N-methylpropylhexadecylamine, and morpholine.

34. The composition of claim 19, wherein the amine compound is N,N-dimethyl hexadecylamine.

35. The composition of claim 19, wherein the composition is cured.

36. A method of forming a composition comprising combining:
   an amine and a isoolefin copolymer comprising halomethylstyrene moieties present from 95% to 5% by weight of the composition, and wherein the isoolefin having between 4 and 7 carbon atoms and the copolymer containing from 0.5% to 20% by weight halomethylstyrene; and
   wherein the amine compound represented by the formula $(R^1R^2R^3)N$, wherein $R^1$ is either hydrogen or a $C_4$ to $C_{30}$ hydrocarbyl group, $R^2$ is either hydrogen or a $C_1$ to $C_{30}$ hydrocarbyl group; and $R^3$ is either hydrogen or a $C_1$ to $C_{30}$ hydrocarbyl group, provided that at least one of $R^1$, $R^2$ and $R^3$ is not hydrogen.

37. The method of claim 36, further comprising an additional rubber component, wherein the additional rubber component selected from butyl rubber, halogenated butyl rubber, star-branched butyl rubber, halogenated star-branched butyl rubber, isobutylene homopolymer, butadiene rubber, neoprene, nitrile rubbers, ethylene/propylene/diene terpolymers, ethylene/propylene copolymers, styrene butadiene rubbers, polybutadiene, polyisoprene, isoolefin/alkylstyrene copolymer, halogenated isoolefin/alkylstyrene copolymer, natural rubber, polypropylene, polyethylene, polyurethane, polyvinyl chloride, silicon rubber, propylene oxide polymer, and mixtures thereof.

38. The method of claim 37, wherein the rubber component is present from 5% to 95% by weight of the composition.

39. The method of claim 37, wherein the rubber component is halogenated butyl rubber.

40. The method of claim 39, wherein the halogenated butyl rubber contains from 85% to 99.5% by weight repeat units derived from isobutylene, from 0.1 to 15% by weight repeat units derived from conjugated diene and from 0.1% to 15% by weight halogen.

41. The method of claim 39, wherein the halogenated butyl rubber contains from 85% to 99.5% by weight repeat units derived from isobutylene, from 0.1 to 15% by weight repeat units derived from isoprene and from 0.1% to 15% by weight bromine.

42. The method of claim 36, wherein the copolymer contains isobutylene from 88% to 98% by weight copolymer.

43. The method of claim 36, wherein the copolymer is halogenated poly(isobutylene-co-p-methylstyrene).

44. The method of claim 43, wherein from 0.01 mole % to 60 mole % of the methyl groups are halomethyl groups.

45. The method of claim 36, wherein the composition contains from 0.05 to 2 mole equivalents of amine relative to the number of moles of halogen present in the composition.

46. The method of claim 36, wherein $R^3$ is a $C_1$ to $C_8$ hydrocarbyl group.

47. The method of claim 36, wherein both $R^1$ and $R^2$ are hydrogen.

48. The method of claim 36, wherein both $R^1$ and $R^2$ are $C_4$ to $C_{30}$ hydrocarbyl groups.

49. The method of claim 36, wherein $R^1$ is a $C_4$ to $C_{30}$ hydrocarbyl group and $R^2$ is a $C_1$ to $C_4$ hydrocarbyl group.

50. The method of claim 36, wherein $R^1$ is a $C_4$ to $C_{30}$ hydrocarbyl group, $R^2$ is a $C_1$ to $C_4$ hydrocarbyl group and $R^3$ is a $C_1$ to $C_8$ hydrocarbyl group.

51. The method of claim 36, wherein the amine compound is selected from N,N-dimethylhexadecylamine, N,N-dimethylhexylamine, N,N-dimethyldodecylamine, N,N-dimethyloctadecylamine, N,N-diethyldecylamine, N,N-dimethylbenzylamine, N,N-methylpropylhexadecylamine, and morpholine.

52. The composition of claim 36, wherein the amine is present from 0.01 to 5 wt % of the composition.

53. The method of claim 36, wherein the composition is cured.

54. A method of forming a composition comprising combining:
   from 5% to 95% by weight of a rubber component;
   an amine compound represented by the formula $(R^1R^2R^3)N$, wherein $R^1$ is either hydrogen or a $C_4$ to $C_{30}$ hydrocarbyl group, $R^2$ is either hydrogen or a $C_1$ to $C_{30}$ hydrocarbyl group; and $R^3$ is either hydrogen or a $C_1$ to $C_{30}$ hydrocarbyl group, provided that at least one of $R^1$, $R^2$ and $R^3$ is not hydrogen; and
   a isoolefin copolymer comprising a halomethylstyrene derived unit from 95% to 5% by weight of the composition, the isoolefin having between 4 and 7 carbon atoms and the copolymer containing from 0.5% to 20% by weight halomethylstyrene.

55. The method of claim 54, wherein the rubber component is selected from butyl rubber, halogenated butyl rubber, star-branched butyl rubber, halogenated star-branched butyl rubber, isobutylene homopolymer, butadiene rubber, neoprene, nitrile rubbers, ethylene/propylene/diene terpolymers, ethylene/propylene copolymers, styrene butadiene rubbers, polybutadiene, polyisoprene, isoolefin/alkylstyrene copolymer, halogenated isoolefin/alkylstyrene copolymer, natural rubber, polypropylene, polyethylene, polyurethane, polyvinyl chloride, silicon rubber, propylene oxide polymer, and mixtures thereof.

56. The method of claim 54, wherein the rubber component is halogenated butyl rubber.

57. The method of claim 56, wherein the halogenated butyl rubber contains from 85% to 99.5% by weight repeat units derived from isobutylene, from 0.1 to 15% by weight repeat units derived from conjugated diene and from 0.1% to. 15% by weight halogen.

58. The method of claim 56, wherein the halogenated butyl rubber contains from 85% to 99.5% by weight repeat units derived from isobutylene, from 0.1 to 15% by weight repeat units derived from isoprene and from 0.1% to 15% by weight bromine.

59. The method of claim 54, wherein the copolymer contains isobutylene from 88% to 98% by weight copolymer.

60. The method of claim 54, wherein the copolymer is halogenated poly(isobutylene-co-p-methylstyrene).

61. The method of claim 54, wherein the composition contains from 0.05 to 2 mole equivalents of amine relative to the number of moles of halogen present in the composition.

62. The method of claim 54, wherein $R^3$ is a $C_1$ to $C_8$ hydrocarbyl group.

63. The method of claim 54, wherein $R^1$ and $R^2$ are hydrogen.

64. The method of claim 54, wherein both $R^1$ and $R^2$ are $C_4$ to $C_{30}$ hydrocarbyl groups.

65. The method of claim 54, wherein $R^1$ is a $C_4$ to $C_{30}$ hydrocarbyl group and $R^2$ is a $C_1$ to $C_4$ hydrocarbyl group.

66. The method of claim 54, wherein $R^1$ is a $C_4$ to $C_{30}$ hydrocarbyl group, and $R^2$ is a $C_1$ to $C_4$ hydrocarbyl group and $R^3$ is a $C_1$ to $C_8$ hydrocarbyl group.

67. The method of claim 54, wherein the amine compound is selected from N,N-dimethylhexadecylamine, N,N-dimethylhexylamine, N,N-dimethyldodecylamine, N,N-dimethyloctadecylamine, N,N-diethyldecylamine, N,N-dimethylbenzylamine, N,N-methylpropylhexadecylamine, and morpholine.

68. The method of claim 54, wherein the amine compound is N,N-dimethyl hexadecylamine.

69. The method of claim 54, wherein the amine is present from 0.01 to 5 wt % of the composition.

70. The method of claim 1, wherein the wherein the composition is cured.

* * * * *